US012674859B2

(12) United States Patent
Studerus

(10) Patent No.: US 12,674,859 B2
(45) Date of Patent: Jul. 7, 2026

(54) UWB LOCALIZATION DEVICE AND METHOD

(71) Applicant: dormakaba Schweiz AG, Rümlang (CH)

(72) Inventor: Paul Studerus, Oberweningen (CH)

(73) Assignee: dormakaba Schweiz AG, Rümlang (CH)

( * ) Notice: Subject to any disclaimer, the term of this patent is extended or adjusted under 35 U.S.C. 154(b) by 290 days.

(21) Appl. No.: 18/566,392

(22) PCT Filed: Jun. 2, 2022

(86) PCT No.: PCT/EP2022/065031
§ 371 (c)(1),
(2) Date: Dec. 1, 2023

(87) PCT Pub. No.: WO2022/253949
PCT Pub. Date: Dec. 8, 2022

(65) Prior Publication Data
US 2024/0264263 A1 Aug. 8, 2024

(30) Foreign Application Priority Data

Jun. 3, 2021 (CH) .................................... 00647/21

(51) Int. Cl.
*G01S 5/02* (2010.01)
(52) U.S. Cl.
CPC .......... *G01S 5/0273* (2013.01); *G01S 5/0221* (2013.01); *G01S 5/0284* (2013.01)
(58) Field of Classification Search
None
See application file for complete search history.

(56) References Cited

U.S. PATENT DOCUMENTS 11,520,550 B1 * 12/2022 Bushnell ................... H04R 5/04
12,330,680 B2 * 6/2025 Jhao ..................... B60W 60/001
(Continued)

FOREIGN PATENT DOCUMENTS

CN      115015835 B  *  4/2024  ............... G01S 5/06
CN      113126025 B  *  8/2024  ............. G06F 16/53
(Continued)

OTHER PUBLICATIONS

International Search Report and Written Opinion issued in International PCT Application No. PCT/EP2022/065031, dated Oct. 13, 2022, in 13 pages.
(Continued)

*Primary Examiner* — Mohammed Rachedine
(74) *Attorney, Agent, or Firm* — Knobbe, Martens, Olson & Bear, LLP

(57) ABSTRACT

A UWB localization device comprising a UWB receiver with a first and second antenna device for receiving UWB signals from a UWB transmitter; a UWB shield arranged between the antenna devices; and a processing unit. The processing unit is configured to determine, by processing properties of the UWB signals, a first and a second time of arrival of UWB signals from a UWB transmitter at the first and second antenna devices; and to determine a location of the UWB transmitter based on the first and second time of arrival. The UWB shield is configured to cause a delay in the second time of arrival of UWB signals from the UWB transmitter received at the second antenna device. The first and the second antenna devices are arranged with opposing antenna sensitivity patterns.

16 Claims, 11 Drawing Sheets

(56)          References Cited

U.S. PATENT DOCUMENTS

| | | | |
|---|---|---|---|
| 2024/0023055 A1* | 1/2024 | Song | G01S 5/0205 |
| 2024/0114315 A1* | 4/2024 | Shin | H04W 4/023 |
| 2024/0118368 A1* | 4/2024 | Shin | G01S 5/0289 |
| 2025/0081156 A1* | 3/2025 | Shin | H04W 64/00 |

FOREIGN PATENT DOCUMENTS

| | | | | | |
|---|---|---|---|---|---|
| CN | 118465806 A | * | 8/2024 | | G01S 5/04 |
| KR | 20230121420 A | * | 8/2023 | | G01S 5/0205 |
| WO | WO 2020/067840 A1 | | 4/2020 | | |
| WO | WO 2021/058479 A1 | | 4/2021 | | |

OTHER PUBLICATIONS

Search Report issued in Swiss Patent Application No. CH 00647/21, dated Jun. 3, 2021, in 3 pages.

* cited by examiner

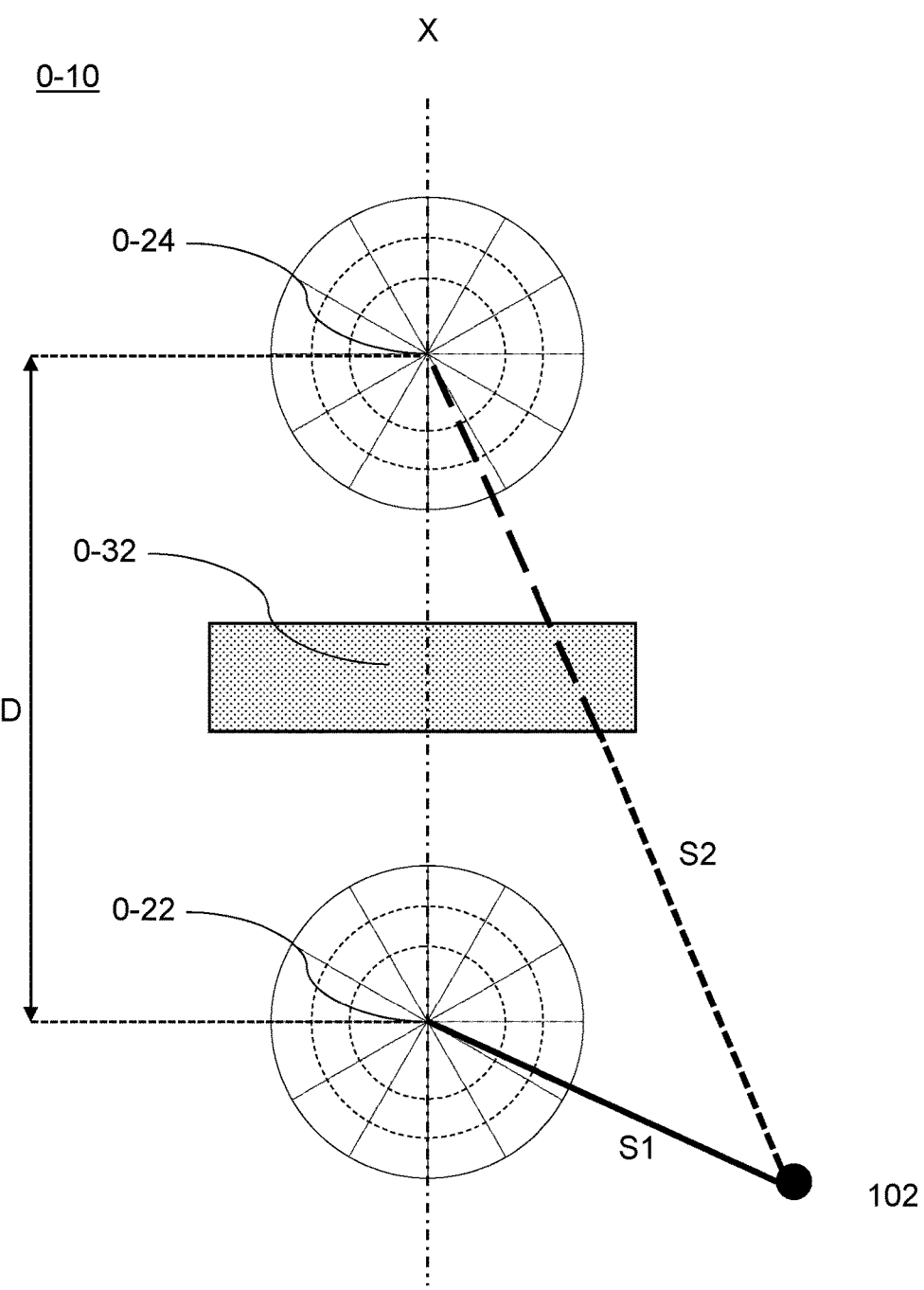
Prior art.                    Fig. 1

UWB LOCALIZATION DEVICE AND METHOD

CROSS-REFERENCE TO RELATED APPLICATIONS

This application is the U.S. National Phase under 35 U.S.C. § 371 of International Application No. PCT/EP2022/065031, filed Jun. 2, 2022, titled UWB LOCALIZATION DEVICE AND METHOD, which claims priority to CH Patent Application No. 00647/21, filed Jun. 3, 2021, the entirety of each of which is hereby expressly incorporated by reference herein.

FIELD OF THE INVENTION

The present disclosure relates to a UWB localization device, a security control system comprising a UWB localization device, and a portable computing device comprising a UWB localization device. The present disclosure further relates to a method for determining a location of a UWB transmitter using a UWB localization device as well as an access control method.

BACKGROUND OF THE INVENTION

Localization respectively tracking of devices, referred to as tokens has long been an important area of research and development based on various operating principles/technologies.

A significant proportion of localization technologies are based on the processing of properties of radio signals emitted by a radio transmitter of the token and received using a radio signal receiver of a localization device. Processing properties of the received radio signals allows determining a distance between the token and the localization device. In particular, measurement of a transmission time, also referred to as time-of-flight, of radio signals has proven over time to be a highly reliable method of determining the location of a radio transmitter (token). In order to allow localization of tokens in more than one dimension, properties of radio signals received at two or more antennas are processed using multilateration.

Localization of tokens using Ultra-wideband UWB radio signals has gained increased attention is recent years. UWB is a technology for transmitting radio signals across a wide bandwidth (e.g. >500 MHz), allowing the transmission of a large amount of signal energy without interfering with conventional narrowband and carrier wave transmission in the same frequency band. As opposed to conventional localization technologies based on radio signals which transmit information by varying the amplitude (power level), frequency, and/or phase of a radio signal, UWB technology is based on the transmission of information by generating radio energy at specific time intervals and occupying a large bandwidth, thus enabling pulse-position or time modulation.

UWB technology allows a higher accuracy of localization of tokens over other radio-based localization technologies and is also much more resilient against manipulation, in particular against so-called relay-attacks, wherein a signal amplifier/repeater is used to deceive localization devices based on measurement of signal strength to thereby compromise the localization of the token.

A particular application of localization devices relates to their use in access control systems. Keyless entry systems have become widely used in applications for access control. Access control relates to granting, denying or limiting access to particular section(s) of a secure controlled area, usually by means of some level of access control by use of a barrier, such as a door, turnstile, parking gate, elevator door, or other barrier.

Keyless entry systems operate in that an access control device executes a wireless communication with an authentication device, such as a keyless fob, a keycard or an authentication device incorporating a corresponding wireless transmitter. Once said wireless communication between the access control device and the authentication device has been executed, the access control device exchanges data messages with the authentication device. The authentication can be initiated either by a user, for instance by pressing a button on the authentication device to trigger transmission of authentication data to the access control device, or from the access control device itself which periodically transmits request signals and awaits a response message from the authentication device comprising authentication data. Upon successful authentication, i.e. verification of user credentials (e.g. by correlating authentication data received from the authentication device with a list of authorized users), the access control device grants access to the user in possession of the respective authentication device, e.g. by opening said barrier. On the other hand, if the authentication fails, the access control device denies access to the user in possession of the respective authentication device, e.g. by locking the barrier/by keeping the barrier locked.

For close-range applications, a radio-frequency identification (RFID) transponder (or tag) is often used, which has mostly replaced earlier magnetic stripe cards. Other current solutions use infra-red systems or radio systems to transmit an authenticating signal from an authentication device to an access control device of a security control system. Close-proximity keyless systems, (i.e. between direct contact and a threshold of a few centimeters), for example RFID based systems, allow determination of a user's proximity to a barrier by appropriate placement of a reader device of the access control device. However, as their name implies close-proximity keyless systems suffer from the disadvantage that they require a very close proximity of the authentication device to the access control device. In order to overcome this disadvantage, mid-range keyless entry systems have been proposed, in particular based on ultra-wideband UWB communication. Ultra-wideband UWB systems are advantageous since they allow reliable mid-range communication without a user having to precisely locate the reader device. As the communicating range between an authentication device and an access control device increases, the convenience and ease-of-use increases, because the authentication device does not need to be placed in very close range, such as less than one centimeter from the access control device. The user no longer needing to precisely locate the access control device (or its antenna) not only adds convenience but also has the potential to speed up the process, thereby increasing the throughput through a barrier.

With increasing adoption of UWB technology, there is an increasing need for reducing the physical size of UWB localization devices. Miniaturization of UWB localization devices poses particular challenges for localization devices capable of localization in more than one dimension, since such require two or more antennas which need to be fitted into the UWB localization device. However, miniaturization of UWB localization devices is currently limited by the physical limitations of the underlying technology. In particular, the precision of distance measurement poses a lower limit as to the distance between the plurality of antennas required for localization in multiple dimensions. Placing the antennas at distances closer than the shortest measurable distance (defined by the precision of distance measurement) would mean that the UWB localization device could not reliably determine a UWB transmitter's location in more than one dimension using multilateration. Irrespective of the hardware used, the frequency range of UWB signals poses a physical limitation with respect to the highest theoretically achievable precision. Furthermore, the hardware used to measure the time-of-flight of the UWB signals of UWB signals from a UWB transmitter to an antenna further reduces the precision as compared to the theoretically achievable, increasing the minimum distance between antennas required for reliable localization using multilateration.

WO2021058479A1 describes the placement of a material between the antennas of a UWB localization device, the material being configured to slow down electromagnetic waves passing therethrough. Even though the delay in the receipt of UWB signals at the antenna "behind" such a material does allow for a certain reduction in the distance between the antennas and hence a reduction of the size of the UWB localization device, there are physical limitations to this approach, in particular with respect to the amount of delay that such a material (configured to slow down electromagnetic waves passing therethrough) is able to cause. The material arranged between the antennas needs to have a considerable thickness in order to achieve a sufficient delay in the receipt of UWB signals at the antenna placed "behind" the material. As an illustrative example: assuming a UWB receiver having a precision of distance measurement of +/−10 centimeters and a dielectric material being capable to slow down electromagnetic waves passing therethrough by a factor of 2, in order to achieve a reduction of the minimum distance between the antennas from 20 cm to 10 cms, the material would need to have a thickness of 10 centimeters. Hence, only by using a material to slow down the UWB signal's propagations speed, a reduction of the minimum distance between the two antennas below 10 centimeters would be impossible. At a distance below this minimum, the UWB receiver could no longer be able to reliably distinguish which antenna is located closer to the UWB transmitter.

SUMMARY OF THE INVENTION

It is an object of embodiments disclosed herein to provide a UWB localization device that overcomes one or more of the disadvantages of known UWB localization devices. According to the present disclosure, this object is achieved by the features of the independent claim 1. In addition, further advantageous embodiments follow from the dependent claims and the description.

In particular, it is an object of embodiments disclosed herein to provide a UWB localization device of reduced size allowing the localization of UWB transmitters in more than one dimension, in particular in two dimensions.

According to the present disclosure, the above-mentioned object is addressed by a UWB localization device comprising a UWB receiver; a UWB shield and a processing unit. In order to enable localization in more than one dimension, the UWB receiver comprises a first antenna device and a second antenna device, each configured for receiving UWB signals from a UWB transmitter. The first antenna device and the second antenna device are arranged spaced apart along a first axis.

According to principles of two-dimensional geometry, if a point lies on two circles, then the circle centers and the two radii (distances) provide sufficient information to narrow the possible locations down to two—one of which is the actual location and the other is an ambiguous location. Additional information often narrows the possibilities down to a unique location. In view of UWB localization devices being commonly installed on a wall or other structure restricting the location of the UWB transmitter, eliminating one degree of uncertainty—localization in two dimensions using multilateration is possible by using only two antenna devices instead of three).

In order to enable reducing the installation distance between the first antenna device and the second antenna device, the UWB shield of the UWB localization device is arranged between the first antenna device and the second antenna device and configured such as to cause a delay in the second time of arrival of UWB signals from the UWB transmitter received at the second antenna device. The delay in the second time of arrival of UWB signals is caused by an increase of the time-of-flight of UWB signals.

In particular, the shield is arranged such that a plane defined thereby is essentially perpendicular to the first axis along which the antenna devices are arranged.

In order to enable further reducing the installation distance between the first antenna device and the second antenna device and/or to increase the reliability of detecting the location of the UWB transmitter, the first antenna device and the second antenna device are arranged with opposing antenna sensitivity patterns, the antenna sensitivity patterns of the first antenna device and the second antenna device are characterized by an inward sensitivity to UWB signals facing the UWB shield along the first axis and an outward sensitivity to UWB signals facing away from the UWB shield along the first axis. In this context, the first antenna device and the second antenna device being arranged with opposing antenna sensitivity patterns translates to the inward sensitivity of the first antenna device being weaker than the outward sensitivity of the first antenna device and the inward sensitivity of the second antenna device being weaker than the outward sensitivity of the second antenna device.

The opposing antenna sensitivity patterns enable a further reduction of the installation distance between the first antenna device and the second antenna device by introducing a further delay in the second time of arrival of those UWB signals from the UWB transmitter at the second antenna device that are received from a direction facing the shield. This further delay, enables a clear distinction between UWB signals received at the second antenna device from a direction facing the shield from UWB signals received from a direction facing away from the shield, allowing a reliable determination of the location of the UWB transmitter.

The opposing antenna sensitivity patterns result in that the UWB signals much reach different signal strengths (amplitudes) for being detected by the UWB antenna devices depending on the direction from which they are received (facing towards respectively away from the shield and the other antenna device). As a consequence of the non-rectangular shape of UWB signals, UWB signals having to reach different amplitudes result in different times of arrival detected. In summary, the weaker inward sensitivity of the antenna devices causes a slightly longer time-of-flight and hence a delayed receipt of the UWB signals coming from the direction of weaker sensitivity.

It shall be noted that the designation first antenna device and the second antenna device are interchangeable and they are designated as "first" and "second" for the mere purpose of clear identification. In use, depending on the location of the UWB transmitter, the UWB signals travel to the two antenna devices, the UWB signals being delayed due to the presence of the UWB shield either at the first antenna device or the second antenna device. In the present disclosure, the term "second antenna device" shall be used to refer to the antenna device (of the first and second antenna devices) situated further away from the UWB transmitter than the first antenna device, "behind the shield".

The processing unit of the UWB localization device is configured to determine, by processing signal properties of the UWB signals received by the UWB receiver, a first time of arrival and a second time of arrival of UWB signals (from the UWB transmitter) at the first antenna device and at the second antenna device, respectively.

Determining a distance based on the time of arrival (time-of-flight measurement) of an ultra-wideband transmission comprises measuring the time required for a signal to travel from the UWB transmitter to the antennas of the UWB receiver. In a particular embodiment, a time difference is used as a basis for determining the distance, as it is more secure against spoofing attacks, wherein a third party may use a radio relay device to gain unauthorized access to a location or system in a so-called "relay-attack". Depending on the embodiment, the time difference is a "one-way time-of-flight" time difference between the UWB transmitter sending the signal and the first respectively second antenna devices of the UWB localization device receiving the UWB signal, or a "round-trip time-of-flight" time difference, in which a second transmission takes place from the UWB localization device to the UWB transmitter. In the "one-way time-of-flight" scenario, the UWB localization device and the UWB transmitter device need to be provided with tightly synchronized clocks for accurately determining the distance. In the latter case of a "round-trip time-of-flight" calculation, there is stored, either in the UWB transmitter or the UWB localization device, an accurate representation of the processing time, i.e. the time it takes between the reception of an ultra-wideband transmission and the sending of a response ultra-wideband transmission, which processing time allows for accurately determining the distance. Measurement of a time required for the signal to travel from the UWB localization device to the UWB transmitter device and back "round-trip time-of-flight" is advantageous as it does not require the precise synchronization of clock signals.

Based on the first time of arrival and the second time of arrival, the processing unit determines a location of the UWB transmitter. According to embodiments disclosed herein, the processing unit determines a location of the UWB transmitter as an absolute location in a physical space where the UWB localization device is installed. Alternatively, or additionally, the processing unit determines a location of the UWB transmitter as a relative location. In a use case where the UWB localization device is installed in the proximity of a passage barrier, such as a door or turnstile, the processing unit determines the location of the UWB transmitter relative to the passage barrier, such as inside/outside.

In summary, the present disclosure addresses the objective of enabling a reduced size of the UWB localization using the combined effects of the UWB shield and the opposing antenna sensitivity patterns of the antenna devices to cause a delay in the receipt of UWB signals. The combined delay in the receipt of UWB signals allows the reduction of the separation distance between the antenna device by a distance corresponding to the delay caused by the UWB shield and the opposing antenna sensitivity patterns.

According to embodiments of the present disclosure, the UWB shield causes a delay in the second time of arrival of UWB signals by being configured to prevent propagation of UWB signals therethrough, in particular by reflecting UWB signals. The UWB shield is configured to prevent propagation of UWB signals through a plane defined by the UWB shield. By preventing propagation of UWB signals therethrough, the UWB shield forces UWB signals to have a longer travel path from the UWB transmitter to the second antenna device. In other words, UWB signals coming from the UWB transmitter cannot reach the second antenna device (the one that is located on the other side of the shield) on the shortest, direct path. Instead, UWB signals coming from the UWB transmitter can reach the second antenna device by reflection, off the UWB shield or other reflective surfaces. Suitable materials of the shield for preventing propagation of UWB signals therethrough by reflection comprise in particular electrically conductive metals, for example copper or silver. Alternatively, the UWB shield is configured to prevent propagation of UWB signals therethrough by absorption.

According to further embodiments of the present disclosure, the UWB shield causes a delay in the second time of arrival of UWB signals by being configured to slow down propagation of UWB signals therethrough. The UWB shield is configured to slow down propagation of UWB signals across a plane defined by the UWB shield. The UWB shield comprises materials having a permeability and/or permittivity chosen such as to slow down propagation of UWB signals as compared to the medium where the UWB localization device is located, most commonly, ambient air.

According to embodiments disclosed herein, the processing unit is configured to determine the location of the UWB transmitter considering an influence on the second time of arrival of one or more of the following factors:

An increase of a distance travelled by UWB signal(s) from the UWB transmitter to the second antenna device due to the presence of the UWB shield;

A difference between a first amplitude of the UWB signal received by the first antenna device and a second amplitude of the UWB signal received by the second antenna device due to their opposing antenna sensitivity patterns;

and/or a delay in the second time of arrival of UWB signals at the second antenna device attributed to a reduction in propagation speed of UWB signals due to the presence of the UWB shield.

The processing unit is configured to take such delays in consideration when determining the distance between the second antenna device and the UWB transmitter. For example, a distance corresponding to the delay caused by any of these factors is subtracted from the distance used in the calculations, i.e. the distance(s) used for multilateration. Alternatively, or additionally, the distances as measured by the first and second antenna devices are averaged in order to calculate the distance between the UWB localization device and the UWB transmitter, whereby the individual measurements by the first and second antenna devices are used to determine on which "side" of the shield the UWB transmitter is located at.

It is an object of further embodiments of the present disclosure to increase the flexibility of the installation of the UWB localization device, in particular its orientation relative to a direction of expected movement of the UWB transmitter to be localized. In order to make the UWB localization device more suitable for localizing a UWB transmitter along a second axis Y perpendicular to the first axis X connecting the first and second antenna devices, according to embodiments of the present disclosure, the UWB receiver further comprises a third antenna device and a fourth antenna device for receiving UWB signals from a UWB transmitter. A second UWB shield is arranged between the third antenna device and the fourth antenna device and configured such as to cause a delay in the propagation of UWB signals from the UWB transmitter and the fourth antenna device. In order to make the UWB localization device more suitable for localizing a UWB transmitter along a second axis Y perpendicular to the first axis X connecting the first and second antenna devices, the second UWB shield is arranged perpendicular to the UWB shield, the third antenna device and the fourth antenna device being arranged spaced apart along a second axis perpendicular to a plane defined by the second UWB shield. Furthermore, the third antenna device and the fourth antenna device are arranged with opposing antenna sensitivity patterns.

The operating principle of the third and the fourth antenna devices in combination with the second UWB shield is analogous to that of the first and second antenna devices and the UWB shield, wherein the processing unit is configured to determine a location of the UWB transmitter by processing signal properties of UWB signals received by the UWB receiver at the first antenna device and the second antenna device or received at the third antenna device and the fourth antenna device, depending on the orientation of the UWB localization device relative to an expected movement direction of the UWB transmitter. If the UWB localization device is installed such that the first axis X (connecting the first and second antenna devices) is parallel to the expected movement direction of the UWB transmitter, then the processing unit is configured to determine a location of the UWB transmitter by processing signal properties of UWB signals received by the UWB receiver at the first antenna device and the second antenna device. On the other hand, if the UWB localization device is installed such that the axis Y (connecting the third and fourth antenna devices) is parallel to the expected movement direction of the UWB transmitter, then the processing unit is configured to determine a location of the UWB transmitter by processing signal properties of UWB signals received by the UWB receiver at the third antenna device and the fourth antenna device.

According to embodiments disclosed herein, the processing unit is configured to automatically detect the pair of antennas devices to be used (first and second vs. third and fourth) automatically. In a further embodiment, in a teaching measurement, UWB signals received at all antenna devices are processed and the appropriate pair of antenna devices (first and second vs. third and fourth) is selected. In a further embodiment, the processing unit continuously processes UWB signals received at all antenna devices and selects the appropriate pair of antenna devices (first and second vs. third and fourth) for determining the location of the UWB transmitter for each detection. Such embodiment is advantageous for example if the UWB localization device is installed on a door causing the orientation of the UWB localization device to alter as the door is swung open/shut closed.

According to an even further embodiment, the processing unit combines the processing of UWB signals received at both pairs of antenna devices (first and second vs. third and fourth) for determining the location of the UWB transmitter for each detection, in particular if there is no well-defined expected orientation of the movement of the UWB transmitters.

According to embodiments disclosed herein, the antenna sensitivity patterns of the first and second antenna devices are mirror symmetric by a plane of symmetry coinciding with the plane defined by the UWB shield.

According to embodiments disclosed herein, any of the antenna devices comprises a single antenna or an antenna array comprising several antennas.

According to embodiments disclosed herein, the particular antenna sensitivity patterns of the antenna devices are achieved by:
    the placement of plate(s) configured to at least partially reflect or absorb UWB signals from a direction of desired weaker sensitivity (e.g. meta-materials, electromagnetic lenses); and/or
    appropriate geometry of UWB antenna(s) of the antenna devices (e.g. horn antennas); and/or
    purposeful orientation of antennas that exhibit non perfect omni-directionality.

It is a further object of the present disclosure to provide a security control system that overcomes one or more of the disadvantages of known security control systems. In particular, it is an object of embodiments disclosed herein to provide a security control system of reduced size. The above-identified objective is addressed by a security control system according to independent claim 8. In addition, further advantageous embodiments follow from the dependent claims and the description. In particular, the above-identified objective is addressed by a security control system comprising a UWB localization device according to one of the embodiments disclosed herein and one or more access control barrier(s) arranged within a secure control area, wherein the security control system is configured to control access through the barrier(s) based on the location of the UWB transmitter.

It is a further object of the present disclosure to provide a portable computing device that overcomes one or more of the disadvantages of known portable computing device. In particular, it is an object of embodiments disclosed herein to provide a portable computing device of reduced size. The above-identified objective is addressed by a portable computing device according to independent claim 9. In addition, further advantageous embodiments follow from the dependent claims and the description. In particular, the above-identified objective is addressed by a portable computing device comprising a human interaction device HID, such as a touch sensitive display, a communication device for wireless communication, a processor and a UWB localization device according to one of the embodiments disclosed herein. The use in a portable computing device of the UWB localization device according to the present disclosure is particularly advantageous, since integration into a portable computing device makes use of the miniaturization made possible by reduced minimum distance between antenna devices enabled by the combined effects of a UWB shield and opposing sensitivity patterns.

It is a further object of the present disclosure to provide a method for determining the location of a token such as a UWB transmitter that overcomes one or more of the disadvantages of known methods. In particular, it is an object of embodiments disclosed herein to provide a method for determining a location of a UWB transmitter using a UWB localization device of reduced size. The above-identified objective is addressed by a method for determining the location of a token according to independent claim 10. In addition, further advantageous embodiments follow from the dependent claims and the description.

It is a further object of the present disclosure to provide an access control method that overcomes one or more of the disadvantages of known methods. In particular, it is an object of embodiments disclosed herein to provide an access control method using a UWB localization device of reduced size. The above-identified objective is addressed by an access control method according to independent claim 13. In addition, further advantageous embodiments follow from the dependent claims and the description. In a first step of the access control method, a location of an authentication device(s) comprising a UWB transmitter is determined using the method for determining a location of a UWB transmitter according to one of the embodiments disclosed herein. In a next step, authentication data is received from the authentication device(s). Thereafter, the authentication data is verified in order to determine whether the authentication device(s) is authorized in view of its determined location of the authentication device. Finally, access is granted if the authentication device(s) is authorized.

In order to restrict access to users (in possession of a UWB transmitter) located in a specific location, a security perimeter is associated with the UWB localization device It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described disclosure will be more fully understood from the detailed description given herein below and the accompanying drawings which should not be considered limiting to the disclosure described in the appended claims. The drawings in which:

FIG. 1: shows a highly schematic top view of a prior art UWB localization device;

FIG. 8A: shows a highly schematic top view of a UWB localization device according to the present disclosure, comprising two pairs of antenna devices;

FIG. 8B: shows a further highly schematic top view of the UWB localization device of FIG. 8A;

DETAILED DESCRIPTION OF EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

FIG. 1 shows a highly schematic top view of a prior art UWB localization device 0-10 comprising a UWB receiver 0-20; a UWB shield 0-32 and a processing unit (not shown). In order to enable localization in more than one dimension, the UWB receiver 0-20 comprises a first antenna device 0-22 and a second antenna device 0-24, each configured for receiving UWB signals from a UWB transmitter 102. The first antenna device 0-22 and the second antenna device 0-24 are arranged spaced apart equidistantly from the shield along a first axis X. To allow for a certain reduction in the distance D between the antennas 0-22 and 0-24, and hence a reduction of the size of the UWB localization device 0-10, a material 0-32 is placed between the antennas 0-22 and 0-24, the material 0-32 being configured to slow down electromagnetic waves passing therethrough. However, as mentioned in the background section of this description, the reduction in the distance D between the antennas 0-22 and 0-24 enabled by the material 0-32 is limited, due to the limited amount of delay of the UWB signals that such a material (configured to slow down electromagnetic waves passing therethrough) is able to cause.

Figure 2A:
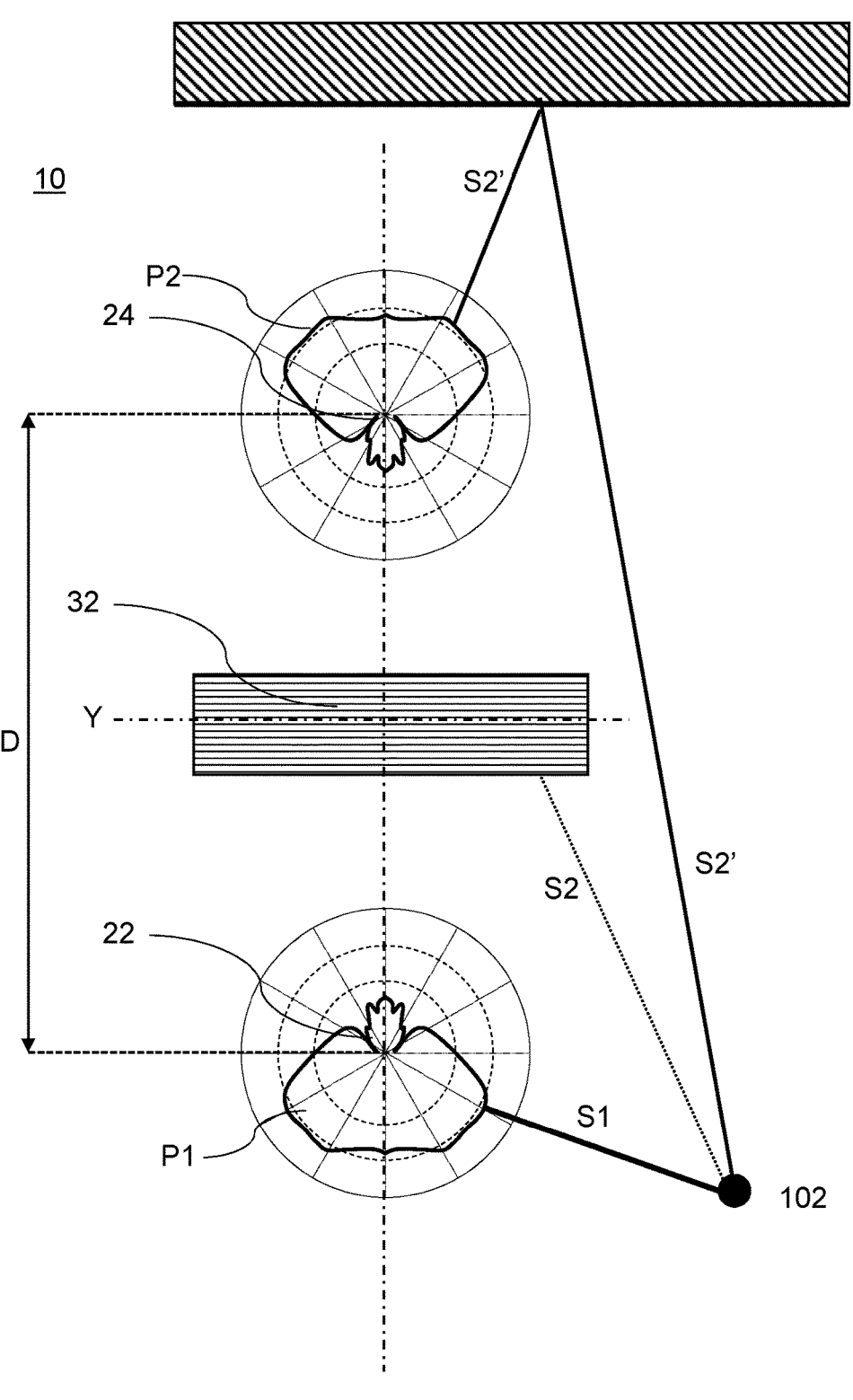
FIG. 2A: shows a highly schematic top view of a UWB localization device according to the present disclosure, illustrating the UWB signals from the UWB transmitter arriving at a point of strong sensitivity of the second antenna device after being reflected.

FIG. 2A shows a highly schematic top view of a UWB localization device 10 according to the present disclosure. The UWB localization device 10 of the present invention comprises a UWB receiver 20; a UWB shield 32 and a processing unit (shown on FIG. 4). In order to enable localization in more than one dimension, the UWB receiver 20 comprises a first antenna device 22 and a second antenna device 24, each configured for receiving UWB signals from a UWB transmitter 102. The first antenna device 22 and the second antenna device 24 are arranged spaced apart equidistantly from the outer surfaces of the UWB shield 32 along a first axis X. The UWB shield 32 of the UWB localization device 10 is arranged between the first antenna device 22 and the second antenna device 24. In particular, the shield 32 is arranged such that a plane defined by it is essentially perpendicular to the first axis X along which the antenna devices 22 and 24 are arranged.

In order to enable reducing the installation distance D between the first antenna device 22 and the second antenna device 24, the UWB shield 32 is configured such as to cause a delay in the second time of arrival of UWB signals from the UWB transmitter 102 received at the second antenna device 24. The delay in the second time of arrival of UWB signals is caused by an increase of the time-of-flight of UWB signals.

According to the embodiment shown of FIG. 2A, the UWB shield 32 causes a delay (in the second time of arrival of UWB signals from the UWB transmitter 102 received at the second antenna device 24) by preventing propagation of UWB signals therethrough by reflection. Thereby, the UWB signals from the UWB transmitter 102 cannot travel to the second antenna device 24 on the shortest path—shown on FIG. 2A with a dotted fine line. Instead, the UWB signals from the UWB transmitter 102 arrive at the second antenna device 24 after being reflected from a wall (not part of the claimed subject-matter). Thereby, the UWB signals from the UWB transmitter 102 are forced to travel a significantly longer path to the second antenna device 24 than to the first antenna device 22, enabling the processing device 40 to make a clear distinction between the first time of arrival and the second time of arrival (of UWB signals from the UWB transmitter 102 at the first antenna device 22 and at the second antenna device 24, respectively).

Figure 2B:
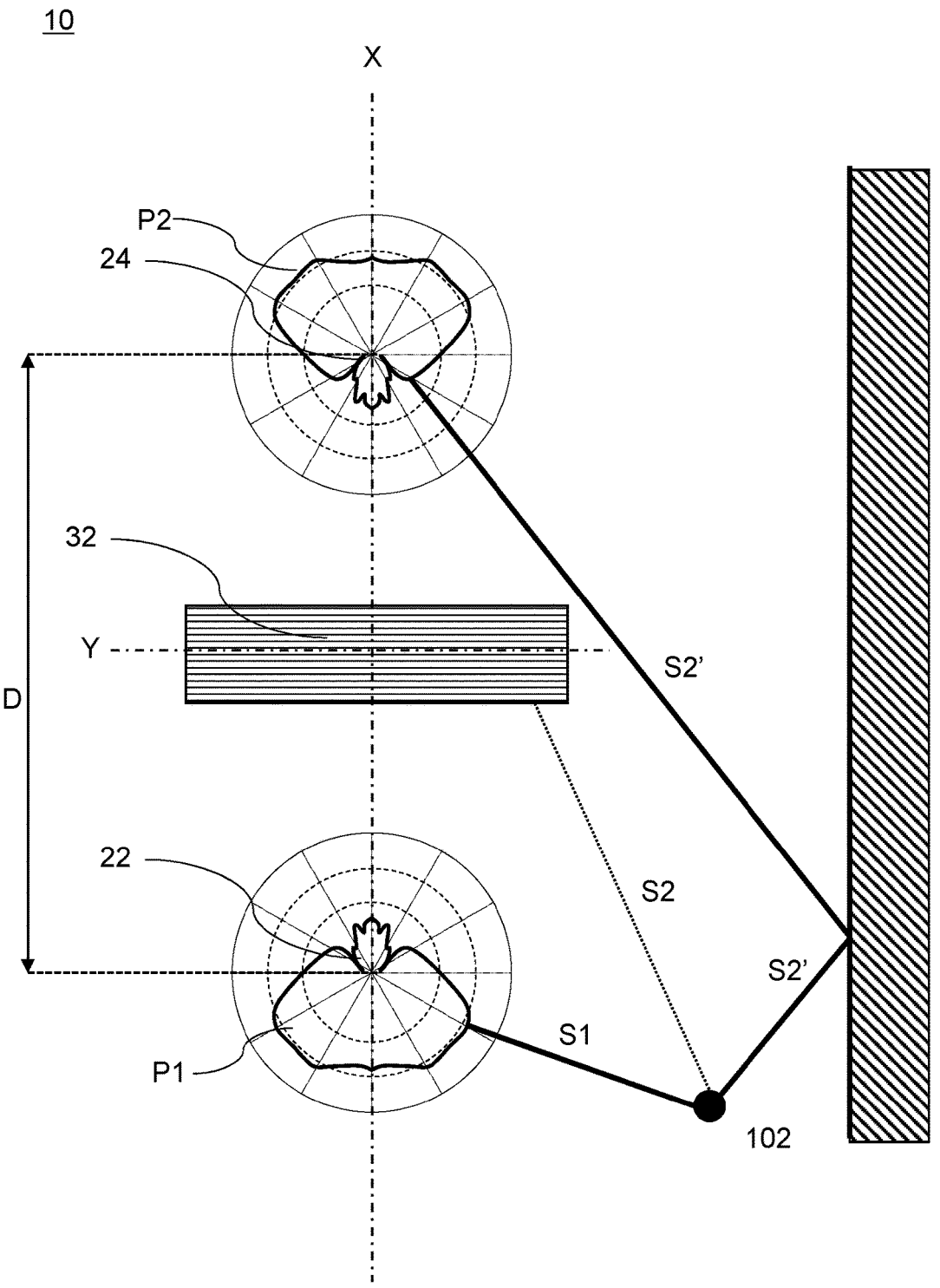
FIG. 2B: shows a highly schematic top view of a UWB localization device according to the present disclosure, illustrating the UWB signals from the UWB transmitter arriving at a point of weak sensitivity the second antenna device after being reflected.
Figure 2C:
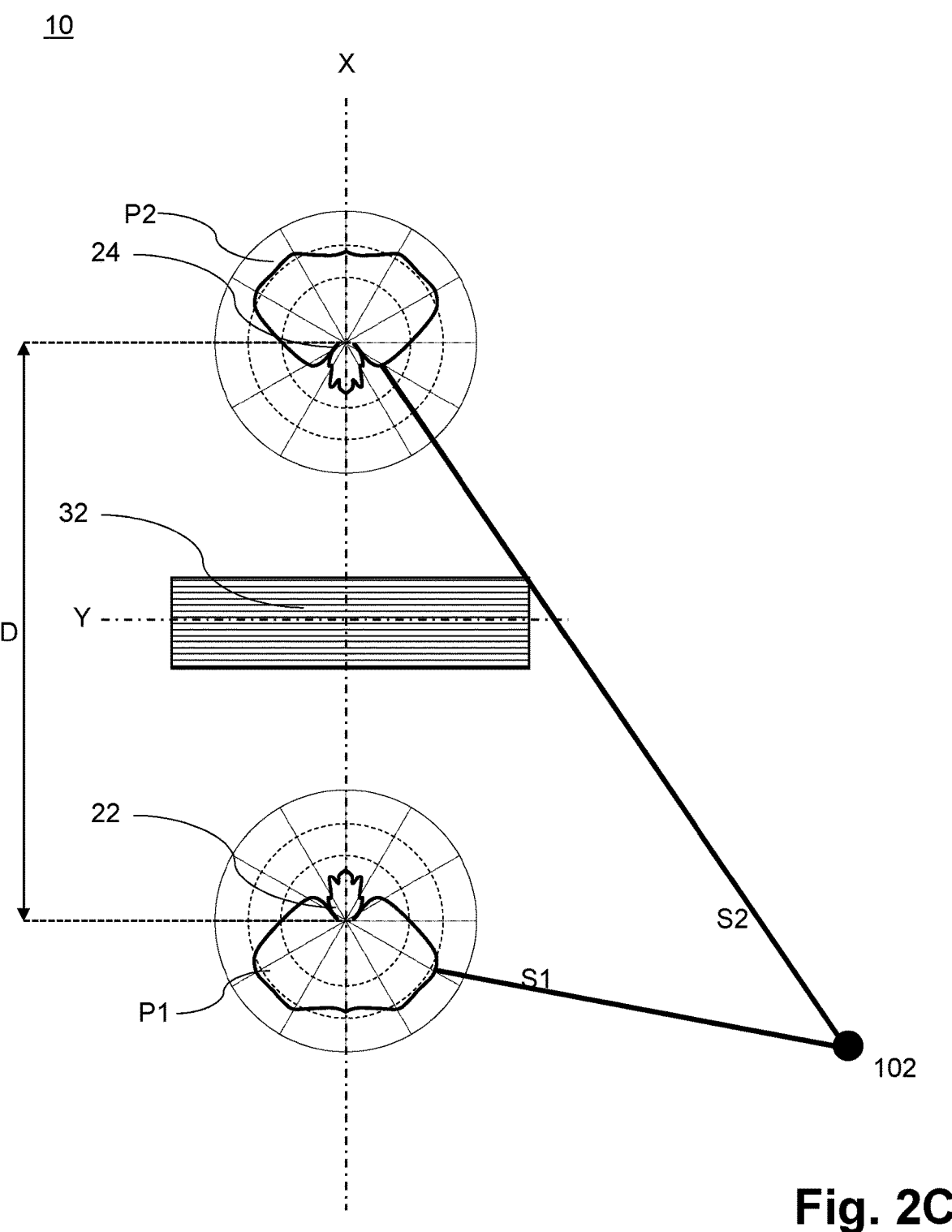
FIG. 2C: shows a highly schematic top view of a UWB localization device according to the present disclosure, illustrating the UWB signals from the UWB transmitter arriving at a point of weak sensitivity the second antenna device without reflection.

FIGS. 2B and 2C show situations where the UWB transmitter 102 is located such that the presence of the shield 32 does not provide—by itself—a sufficient delay (in the second time of arrival of UWB signals from the UWB transmitter 102 received at the second antenna device 24) for a clear distinction between the first time of arrival and the second time of arrival. Such situations are addressed by the purposefully orientation of the antenna sensitivity patterns P1 and P2 as shall be described below.

Contributing to reducing the installation distance D between the first antenna device 22 and the second antenna device 24 and increasing the reliability of detecting the location of the UWB transmitter, the first antenna device 22 and the second antenna device 24 are arranged with opposing antenna sensitivity patterns P1 and P2. In particular, the antenna sensitivity pattern P1 of the first antenna device 22 and the antenna sensitivity pattern P2 of the second antenna device 24 are characterized by an inward sensitivity to UWB signals facing the UWB shield 32 along the first axis X and an outward sensitivity to UWB signals facing away from the UWB shield 32 along the first axis X. The inward sensitivity of the first antenna device 22 is weaker than the outward sensitivity of the first antenna device 22 and the inward sensitivity of the second antenna device 24 is weaker than the outward sensitivity of the second antenna device 24.

As illustrated on FIG. 2B, even though the presence of shield 32 does stop the UWB signals from reaching the second antenna device 24 along the shortest path S2—shown on FIG. 2B with a dotted fine line—the increased path S2' is not sufficiently longer than the direct path S2. Nevertheless, the opposing antenna sensitivity patterns P1 and P2 of the antenna devices 22 and 24, for the case presented in FIG. 2B, the weaker inward sensitivity of the second antenna device 24, causes a further delay in the receipt of the UWB signals at the second antenna device 24. It shall be noted that the delay caused by the weaker inward sensitivity of the second antenna device 24 is in addition to the delay caused by the presence of the shield 32.

According to the present disclosure, the size and placement of the shield 32 as well as the antenna sensitivity patterns P1 and P2 are all designed such that the delay caused in the receipt of UWB signals at the second antenna device 24 is sufficient for a clear distinction between the first time of arrival and second time of arrival (of UWB signals from the UWB transmitter 102 at the first antenna device 22 and at the second antenna device 24, respectively) irrespective of the location of the UWB transmitter 102.

Shown on FIG. 2C, is a situation where despite the presence of the shield 32, UWB signals from the UWB transmitter 102 can reach the second antenna device 24 along the shortest path S2. In this case, only the delay caused by the antenna sensitivity patterns P1 and P2 contributes to the clear distinction between the first time of arrival and second time of arrival (of UWB signals from the UWB transmitter 102 at the first antenna device 22 and at the second antenna device 24, respectively).

It shall be noted that FIGS. 1, and 2A to 2C are not drawn to scale, the dimensions of the UWB localization device 10 being shown disproportionately larger than the distance to the UWB transmitter 102.

Figure 3:
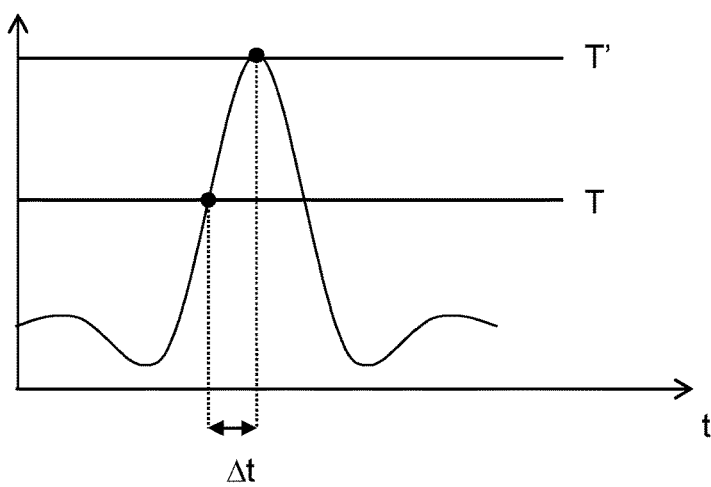
FIG. 3: shows a UWB signal pulse, providing an illustration of the delay in the time of arrival caused by receipt of UWB signals at a point of weaker antenna sensitivity.

FIG. 3 shows a UWB signal pulse, providing an illustration of the delay Δt in the time of arrival caused by receipt of UWB signals at a point of weaker antenna sensitivity. A weaker sensitivity of the antenna device can be viewed as an increased detection threshold T' value above which a UWB signal can be detected by an antenna device. In other words, the UWB signal pulse must reach a higher power level for it to be detected. As a consequence of the shape of UWB signals, the UWB signal pulse reaches said increased detection threshold T' at a later point in time, which is the delay Δt in the time of arrival detected by the antenna device. For example, while already a rising edge of a UWB signal received at a point of strong sensitivity already crosses the detection threshold T, it is only the very peak of the UWB signal that crosses the increased detection threshold T' if the same UWB signal is received at a point of weaker sensitivity characterized by the increased detection threshold T'. The time between the rising edge and the peak of the UWB signal translates to the delay Δt in the time of arrival.

Figure 4:
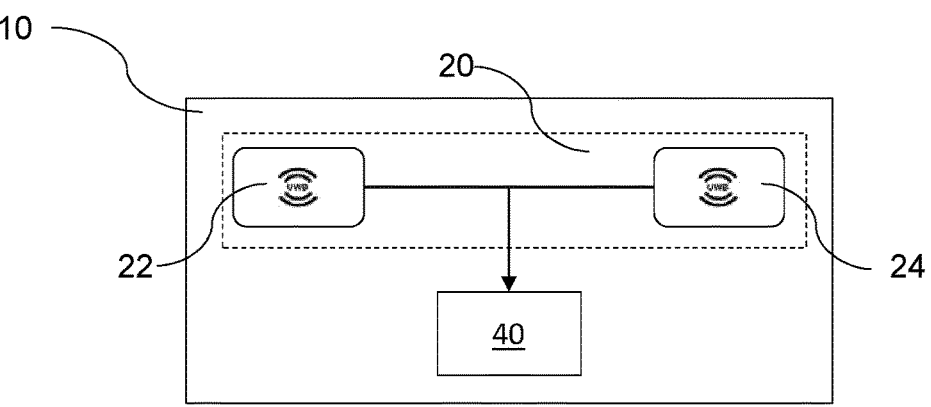
FIG. 4: shows a highly schematic block diagram of a UWB localization device according to the present disclosure.

FIG. 4 shows a highly schematic block diagram of a UWB localization device 10 according to the present disclosure, showing the functional blocks of the first antenna device 22 and the second antenna device 24 communicatively connected to the processing unit 40.

Figure 5:
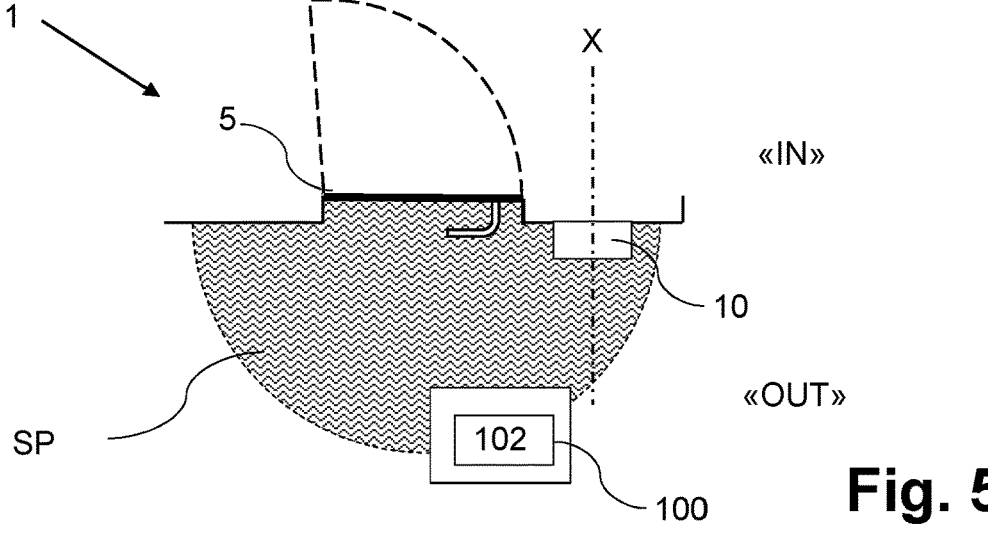
FIG. 5: shows a highly schematic top view of a security control system according to the present disclosure.

FIG. 5 shows a highly schematic top view of a security control system 1 according to the present disclosure, comprising a UWB localization device 10 according to one of the embodiments disclosed herein and an access control barrier 5 arranged within a secure control area. The secure control area may be an entrance area of a building, a hallway, a control section of an airport or the like. A security perimeter SP is associated with the barrier 5. The barrier 5 is communicatively connected to the access control device 1. The barrier 5 may be such as a door, turnstile, parking gate, elevator door, or other barrier. Furthermore, the barrier 5 must not be a physical barrier preventing access, but may—according to embodiments of the present disclosure—also comprise indication means such as audible (such as a siren which is activated if passage is detected despite access not being granted) and or visual means (such as a traffic light). The security control system 1 is configured to perform an access control method—according to one of the embodiments disclosed herein—of an authentication device 100 comprising a UWB transmitter 102.

The security control system 1 is configured to control access through the barrier(s) 5 based on the location of the UWB transmitter 102. In particular, the processing unit 40 is configured to determine the location of the UWB transmitter 102 as a relative location—relative to the passage barrier 5, such as inside IN/outside OUT.

Figure 6:
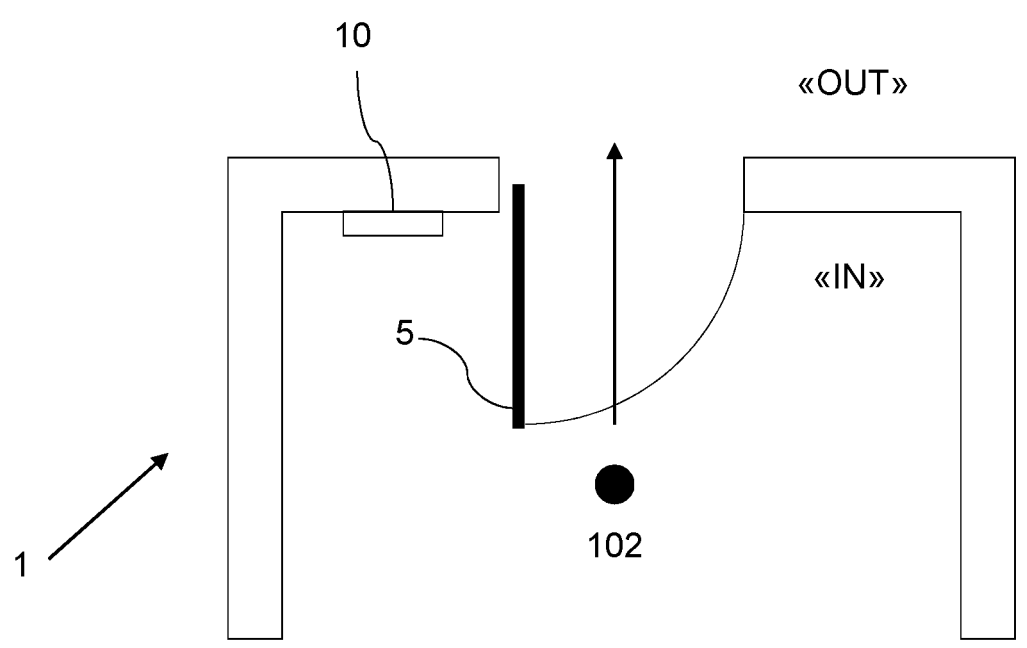
FIG. 6: shows a highly schematic top view of a UWB localization device according to the present disclosure as installed orthogonal to an expected movement direction of UWB transmitters through a passageway (door)
Figure 7:
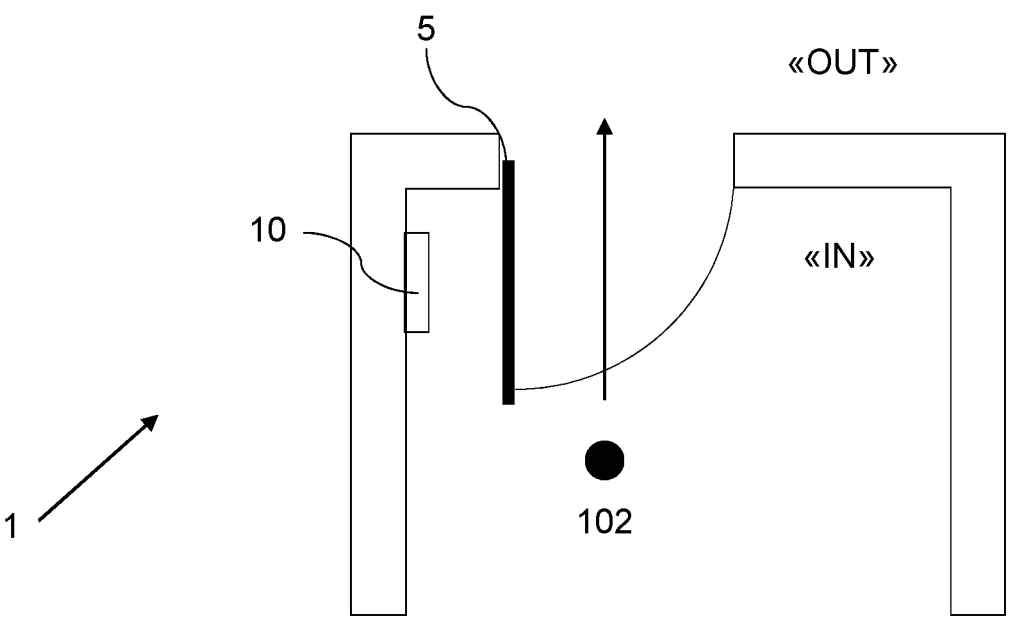
FIG. 7: shows a highly schematic top view of a UWB localization device according to the present disclosure as installed parallel to an expected movement direction of UWB transmitters through a passageway (door)

FIGS. 6 and 7 show highly schematic top views of a UWB localization device 102 as installed in different orientations with respect to an expected direction of movement of the UWB transmitter 102.

Figure 8A:
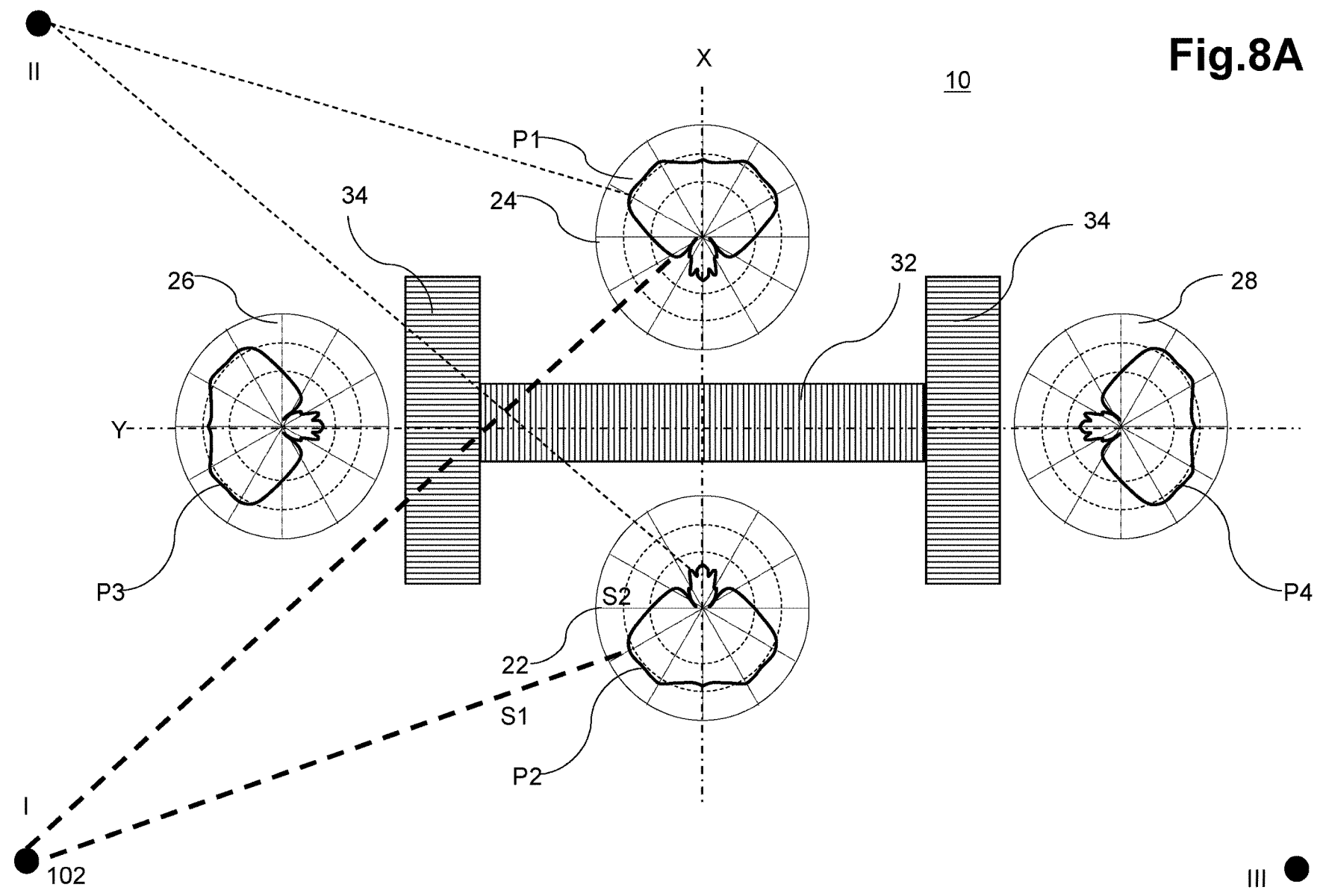
Figure 8B:
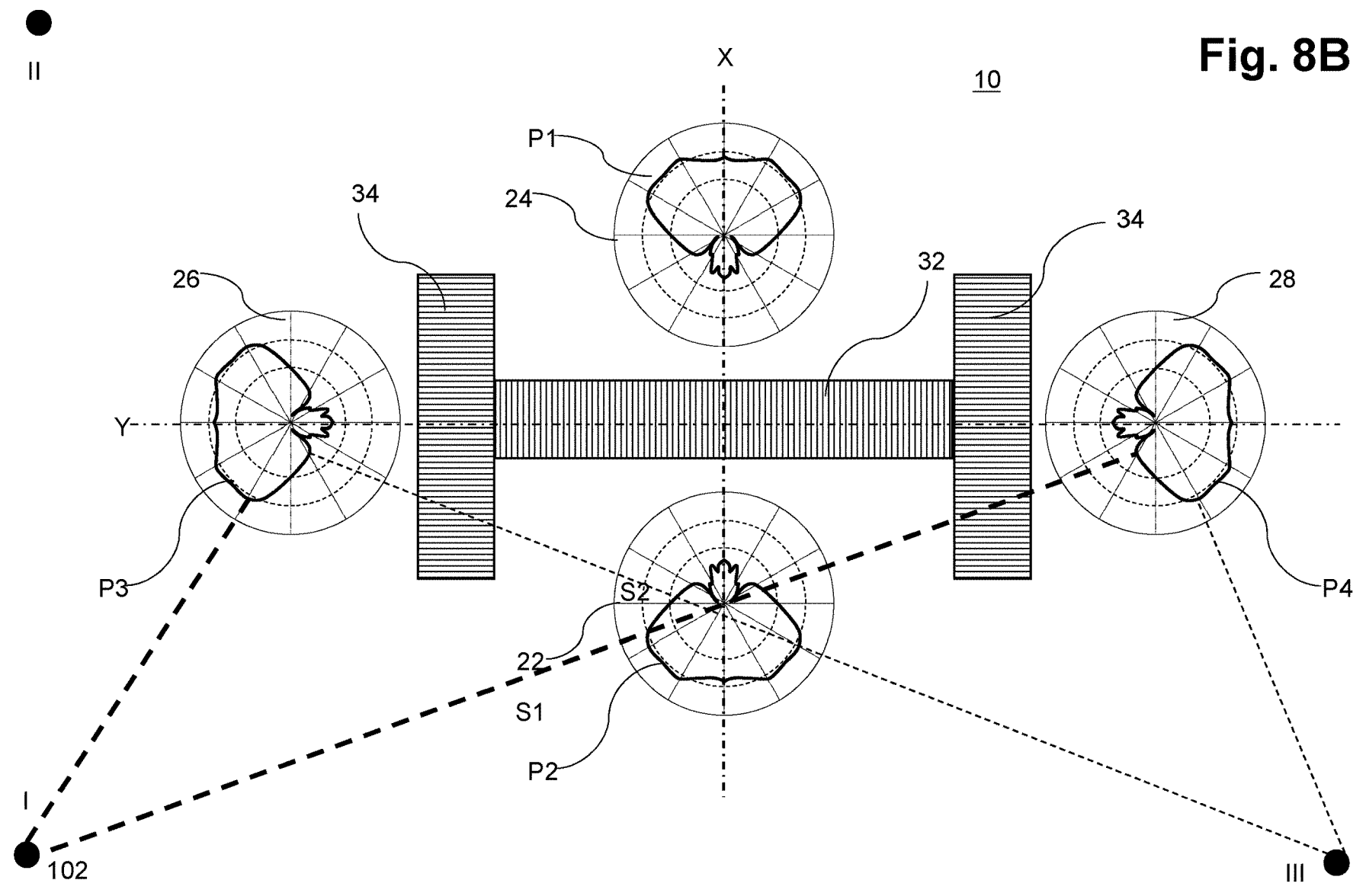

According to the embodiment shown on FIGS. 8A and 8B, in order to make the UWB localization device 10 more suitable for localizing a UWB transmitter 102 along the second axis Y (perpendicular to the first axis X connecting the first and second antenna devices 22 and 24), the UWB receiver 20 further comprises a third antenna device 26 and a fourth antenna device 28 for receiving UWB signals from a UWB transmitter 102.

A second UWB shield 34 is arranged between the third antenna device 26 and the fourth antenna device 28 perpendicular to the UWB shield 32 and configured such as to cause a delay in the propagation of UWB signals from the UWB transmitter 102 and the fourth antenna device 28. The second UWB shield 34 as shown on FIGS. 8A and 8B may actually comprise a pair of shield elements, wherein the pair of shield elements of the second UWB shield 34 and the UWB shield 32 together form an H shaped shielding device, which may be constructed as a single structural element.

The third antenna device 26 and the fourth antenna device 28 are arranged spaced apart equidistantly (from the outer surfaces of the second UWB shield 34) along a second axis Y perpendicular to a plane defined by the second UWB shield 34. Similarly to the first and second antenna devices, the third antenna device 26 and the fourth antenna device 28 are arranged with opposing antenna sensitivity patterns.

Due to the opposing antenna sensitivity patterns of both pairs of antenna devices (22 and 24 respectively 26 and 28), it is ensured that irrespective of the location of the UWB transmitter 102, the UWB signals along the shortest path arrive at points of opposing sensitivities at the first antenna device 22 and the second antenna device 24 or at the third antenna device 26 and the fourth antenna device 28, respectively.

On the example illustrated on FIGS. 8A and 8B:

At a first position I of the UWB transmitter 102, the UWB signals (along the shortest path) arrive at the first antenna device 22 at a point of high sensitivity while they arrive at the second antenna device 24 at a point of weak sensitivity (shown on FIG. 8A with thick dashed lines).

At a second position II of the UWB transmitter 102 (movement along the first axis X), the UWB signals (along the shortest path) arrive at the first antenna device 22 at a point of weak sensitivity while they arrive at the second antenna device 24 at a point of strong sensitivity (shown on FIG. 8A with thin dashed lines).

Alternatively, at the first position I of the UWB transmitter 102, the UWB signals (along the shortest path) arrive at the third antenna device 26 at a point of high sensitivity while they arrive at the fourth antenna device 28 at a point of weak sensitivity (shown on FIG. 8B with thick dashed lines).

At a third position III of the UWB transmitter 102 (movement along the second axis Y), the UWB signals (along the shortest path) arrive at the third antenna device 26 at a point of weak sensitivity while they arrive at the fourth antenna device 28 at a point of strong sensitivity (shown on FIG. 8B with thin dashed lines).

As it can be seen from this example as well, irrespective of the direction of movement/displacement of the UWB transmitter 102, the UWB signals are received at the first and second antenna devices 22 and 24 or at the third and fourth antenna devices 26 and 28 at points of opposing sensitivities of the respective antennas, allowing a reliable determination of the location of the UWB transmitter 102 by the processing unit 40.

Figure 9:
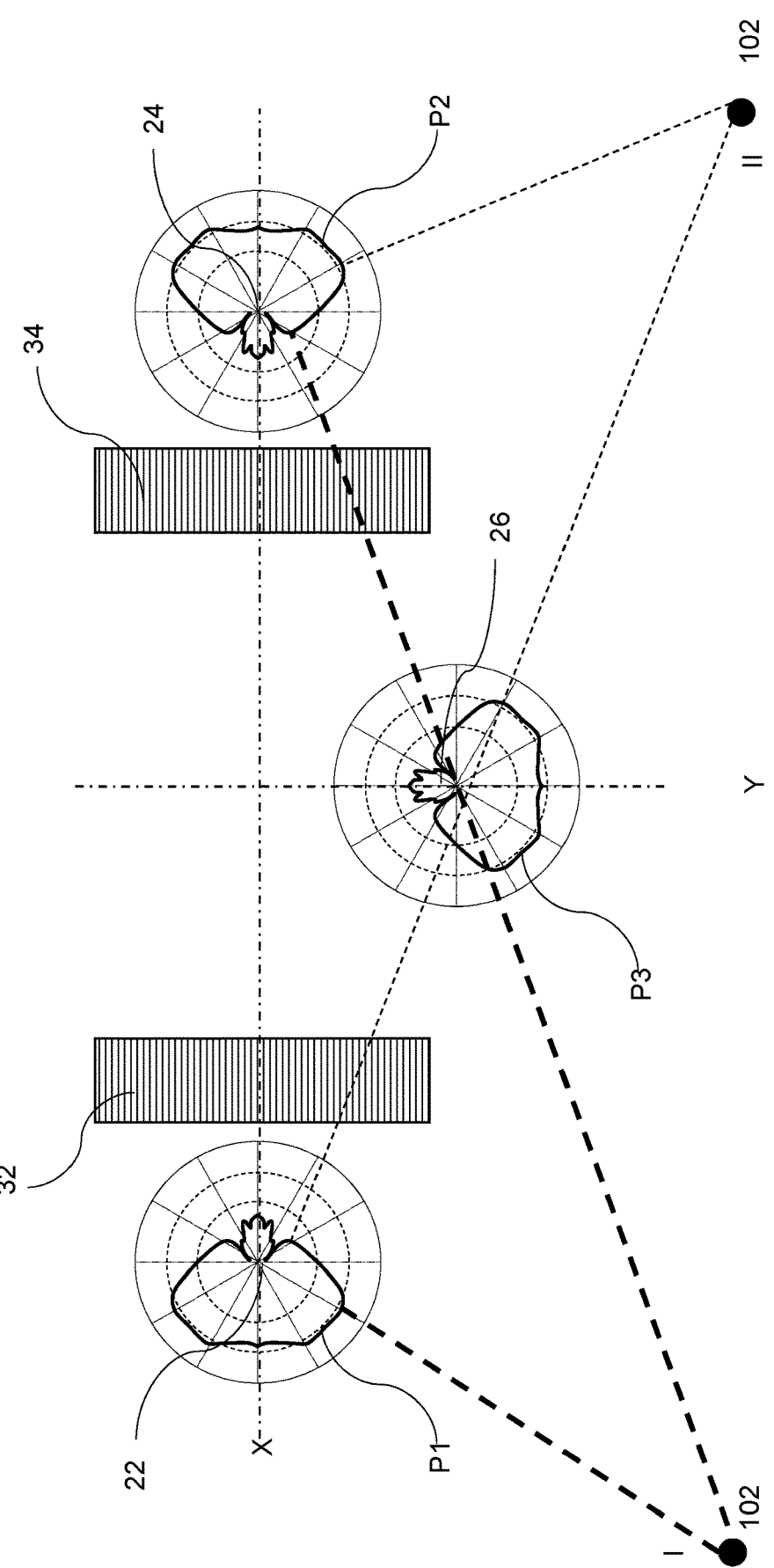
FIG. 9: shows a highly schematic top view of a UWB localization device according to the present disclosure, comprising three antenna devices.
Figure 10:
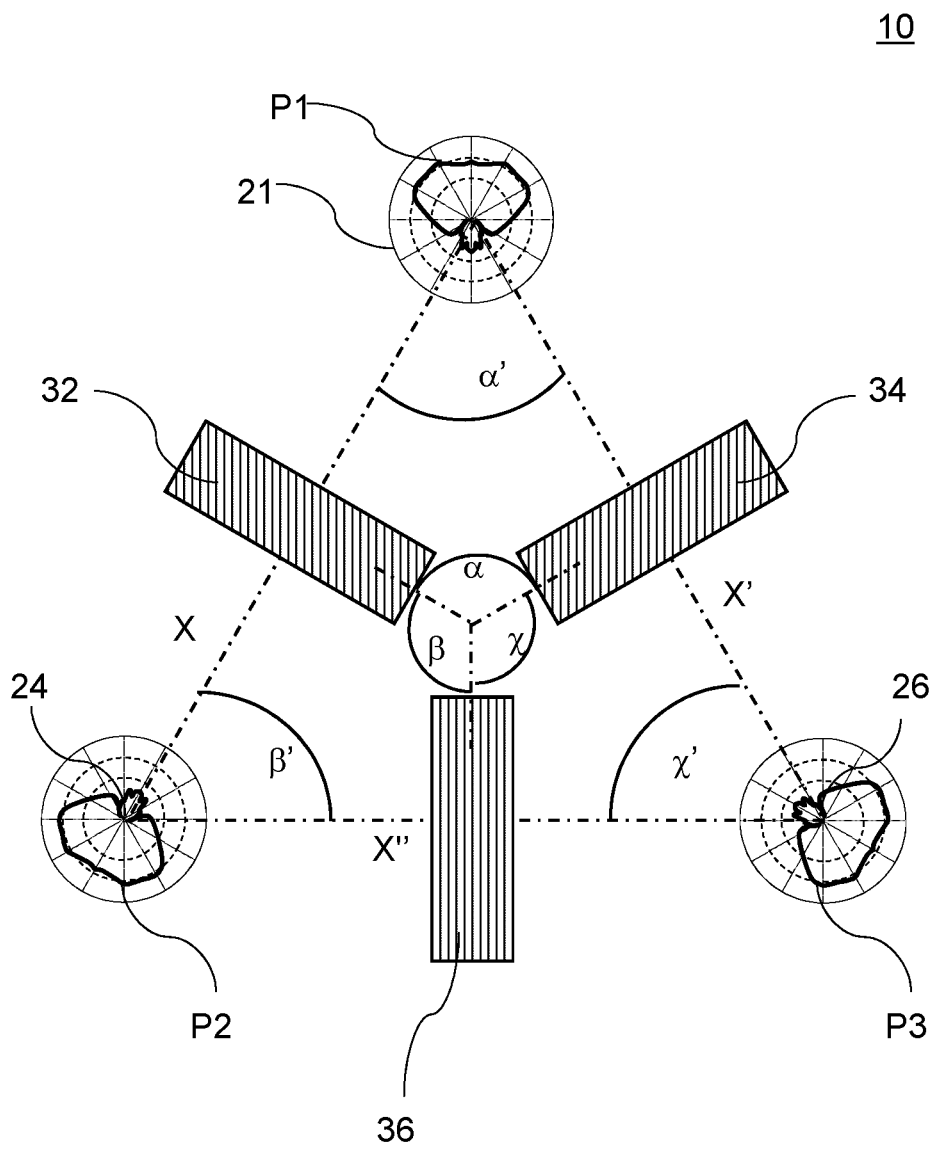
FIG. 10: shows a highly schematic top view of a UWB localization device according to the present disclosure, comprising three antenna devices.

FIG. 9 shows an embodiment of the UWB localization device 10 comprising three antenna devices 22, 24 and 26. As compared to the embodiment of FIGS. 8A and 8B, in use cases where it can be safely assumed that the UWB transmitter 102 is located on one side of the first axis X (connecting the first and second antenna devices 22), three antenna devices 22, 24 and 26 are sufficient to make the UWB localization device 10 suitable for localizing a UWB transmitter 102 along the second axis Y (perpendicular to the first axis X connecting the first and second antenna devices 22 and 24).

The first, second and third antenna devices 22, 24 and 26 are non-collinear, the third antenna device 26 being arranged between the first antenna device 22 and the second antenna device 24 with an offset along the second axis Y (perpendicular to the first axis X connecting the first and second antenna devices 22 and 24).

As illustrated, the third antenna device 26 is arranged such that it has an inward sensitivity facing the first axis X weaker than its outward sensitivity facing away from the first axis X. Due to the antenna sensitivity patterns of the three antenna devices 22, 24 and 26, it is ensured that the UWB signals along the shortest path arrive at points of opposing sensitivities at the first antenna device 22 and the second antenna device 24.

On the example illustrated on FIG. 9:

At a first position I of the UWB transmitter 102, the UWB signals (along the shortest path) arrive at the first antenna device 22 at a point of high sensitivity while they arrive at the second antenna device 24 at a point of weak sensitivity (shown on FIG. 9 with thick dashed lines).

At a second position II of the UWB transmitter 102 (movement along the first axis X), the UWB signals (along the shortest path) arrive at the first antenna device 22 at a point of weak sensitivity while they arrive at the second antenna device 24 at a point of strong sensitivity (shown on FIG. 8A with thin dashed lines).

At any one of the locations, the third antenna device is used in determining the location of the UWB transmitter 102 along the second axis Y.

Alternatively to the embodiments of FIG. 8A, 8B or 9, FIG. 10 shows a further embodiment of the UWB localization device 10, comprising three antenna devices 22, 24 and 26 arranged in a triangle and separated by three UWB shields 32, 34 and 36 arranged in star-shape.

The first antenna device 22 and the second antenna device 24 are arranged spaced apart equidistantly from the outer surfaces of the UWB shield 32 along a first axis X. The UWB shield 32 of the UWB localization device 10 is arranged between the first antenna device 22 and the second antenna device 24, such that a plane defined by it is essentially perpendicular to the first axis X along which the antenna devices 22 and 24 are arranged. In order to enable reducing the installation distance D between the first antenna device 22 and the second antenna device 24, the UWB shield 32 is configured such as to cause a delay in the second time of arrival of UWB signals from the UWB transmitter 102 received at the second antenna device 24.

The third antenna device 26 and the first antenna device 22 are arranged spaced apart along a secondary axis X' perpendicular to a plane defined by the second UWB shield 34, the second antenna device 24 and the third antenna device 26 being arranged spaced apart along a tertiary axis X" perpendicular to a plane defined by the third UWB shield 36.

The second UWB shield 34 is arranged between the first antenna device 22 and the third antenna device 26 and configured such as to cause a delay in the second time of arrival of UWB signals from the UWB transmitter 102 received at the third antenna device 26. The third UWB shield 36 is arranged between the second antenna device 24 and the third antenna device 26 and configured such as to cause a delay in the second time of arrival of UWB signals from the UWB transmitter 102 received at the third antenna device 26, As illustrated, the second UWB shield 34 is arranged at a first angle α to the UWB shield 32 supplementary to an angle α' defined by the first axis X and the secondary axis X'. The third UWB shield 36 is arranged at a second angle β to the first UWB shield 32 supplementary to an angle β' defined by the first axis X and the tertiary axis X".

The antenna sensitivity pattern of the third antenna device 26 and the first antenna device 22 are characterized by an inward sensitivity to UWB signals facing the second UWB shield 34 along the secondary axis X' and an outward sensitivity to UWB signals facing away from the second UWB shield 34 along the secondary axis X', the inward sensitivity being weaker than the outward sensitivity. The antenna sensitivity pattern of the third antenna device 26 and the second antenna device 24 are characterized by an inward sensitivity to UWB signals facing the third UWB shield 36 along the tertiary axis X" and an outward sensitivity to UWB signals facing away from the third UWB shield 36 along the tertiary axis X", the inward sensitivity being weaker than the outward sensitivity.

Accordingly, the processing unit 40 is configured to determine a location of the UWB transmitter 102 by processing signal properties of UWB signals received by the UWB receiver 20: at the first antenna device 22 and the second antenna device 24; and/or at the second antenna device 26 and the third antenna device 26; and/or at the first antenna device 22 and the third antenna device 26.

On the figures, lines representing UWB signals which cross any of the UWB shield(s) represent UWB signals as delayed by the presence of the shield(s), either by being forced to travel a longer path than the direct path or by being slowed down by the shield(s). Hence, lines representing UWB signals crossing any of the UWB shield(s) on the illustrative figures does not necessarily indicate that the UWB signals cross the shield. This form of illustration has been made to simplify the understanding the concepts of delays of UWB signals.

Figure 11:
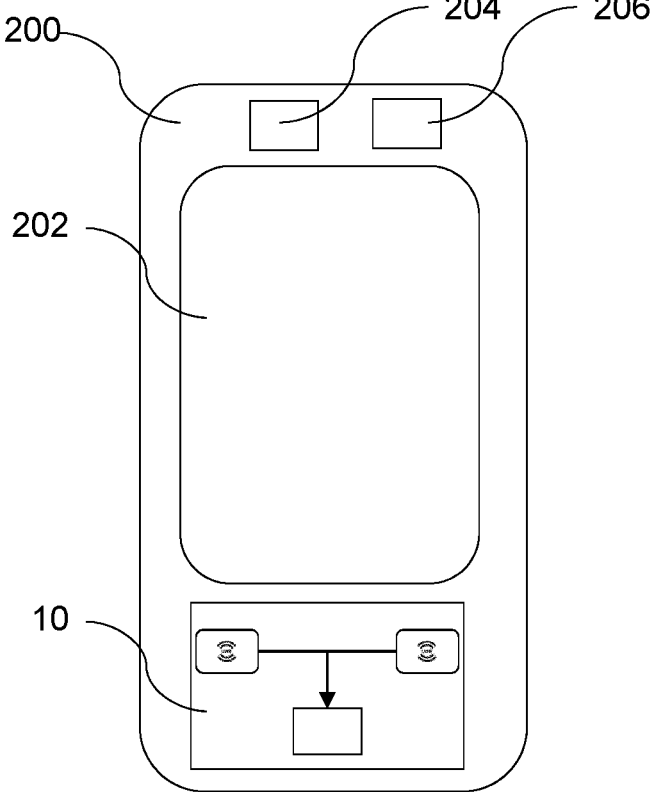
FIG. 11: shows a highly schematic block diagram of a portable computing device comprising a UWB localization device according to the present disclosure.

FIG. 11 shows a highly schematic block diagram of a portable computing device 200 comprising a human interaction device HID 202, such as a touch sensitive display, a processor 206 and a UWB localization device 10 according to one of the embodiments disclosed herein. The portable computing device 200 is an electronic system such as a smart phone, smart watch, tablet, laptop, or similar device.

According to embodiments disclosed herein, the portable computing device 200 further comprises a communication module 204, e.g. for wireless data transmission using an alternative communication technology (as compared to UWB) such as Bluetooth Low Energy (BLE), a Wireless Local Area Network (WLAN), ZigBee, Radio Frequency Identification (RFID), Z-Wave, and/or Near Field Communication (NFC). According to further embodiments disclosed herein, the portable computing device 200 also contains provisions for wired communication via a socket such as USB, Micro-USB, USB-C, Lightning, or 3.5 mm jack, for use in a wired communication using an appropriate protocol for wired transmission.

| List of reference numerals | |
| --- | --- |
| prior art UWB localization device | 0-10 |
| UWB receiver (of prior art UWB localization device) | 0-20 |
| prior art first antenna device (of prior art UWB localization device) | 0-22 |
| second antenna device (of prior art UWB localization device) | 0-24 |
| security control system | 1 |
| barrier | 5 |
| UWB localization device | 10 |
| UWB receiver | 20 |
| first antenna device | 22 |
| antenna sensitivity pattern (of first antenna device) | P1 |
| second antenna device | 24 |
| antenna sensitivity pattern (of second antenna device) | P2 |
| first axis (connecting first and second antenna devices) | X |
| second axis (perpendicular to first axis X) | Y |
| secondary axis | X' |
| tertiary axis | X" |
| third antenna device | 26 |
| antenna sensitivity pattern (of third antenna device) | P3 |
| fourth antenna device | 28 |
| antenna sensitivity pattern (of fourth antenna device) | P4 |
| UWB shield | 32 |
| second UWB shield | 34 |
| third UWB shield | 36 |
| processing unit | 40 |
| secure control area | A |
| security perimeter | SP |
| detection threshold | T |
| authentication device | 100 |
| increased detection threshold | T' |
| UWB transmitter | 102 |
| portable computing device | 200 |
| human interaction device HID | 202 |
| communication device | 204 |
| processor | 206 |

What is claimed is:

1. An ultra-wideband (UWB) localization device comprising:

a UWB receiver comprising a first antenna device and a second antenna device for receiving UWB signals from a UWB transmitter;

a UWB shield arranged between the first antenna device and the second antenna device; and a processing unit configured to:

determine, by processing signal properties of the UWB signals received by the UWB receiver, a first time of arrival and a second time of arrival of UWB signals from the UWB transmitter at the first antenna device and at the second antenna device, respectively; and determine a location of the UWB transmitter based on the first time of arrival and the second time of arrival, wherein the UWB shield is configured such as to cause a delay in the second time of arrival of UWB signals from the UWB transmitter received at the second antenna device, wherein the first antenna device and the second antenna device are arranged spaced apart along a first axis perpendicular to a plane defined by the UWB shield, and wherein antenna sensitivity patterns of the first antenna device and the second antenna device are characterized by an inward sensitivity to UWB signals facing the UWB shield along the first axis and an outward sensitivity to UWB signals facing away from the UWB shield along the first axis, the inward sensitivity being weaker than the outward sensitivity, the first antenna device and the second antenna device being arranged with opposing antenna sensitivity patterns.

2. The UWB localization device according to claim 1, wherein the UWB shield is configured to prevent propagation of UWB signals therethrough, in particular by reflecting UWB signals.

3. The UWB localization device according to claim 1, wherein the UWB shield is configured to slow down propagation of UWB signals therethrough.

4. The UWB localization device according to claim 1, wherein the processing unit is configured to determine the location of the UWB transmitter considering an influence on the second time of arrival of:

an increase of a distance travelled by UWB signal(s) from the UWB transmitter to the second antenna device due to the presence of the UWB shield; and/or a difference between a first amplitude of the UWB signal received by the first antenna device and a second amplitude of the UWB signal received by the second antenna device due to their opposing antenna sensitivity patterns; and/or a delay in the second time of arrival of UWB signals at the second antenna device attributed to a reduction in propagation speed of UWB signals due to the presence of the UWB shield.

5. The UWB localization device according to claim 1, wherein the UWB receiver further comprises:

a third antenna device and a fourth antenna device for receiving UWB signals from a UWB transmitter, a second UWB shield arranged between the third antenna device and the fourth antenna device and configured such as to cause a delay in the second time of arrival of UWB signals from the UWB transmitter received at the fourth antenna device, wherein the second UWB shield is arranged perpendicular to the UWB shield;

wherein the third antenna device and the fourth antenna device are arranged spaced apart along a second axis perpendicular to a plane defined by the second UWB shield;

wherein the antenna sensitivity patterns of the third antenna device and the fourth antenna device are characterized by an inward sensitivity to UWB signals facing the second UWB shield along the second axis and an outward sensitivity to UWB signals facing away from the second UWB shield along the second axis, the inward sensitivity being weaker than the outward sensitivity; and wherein the third antenna device and the fourth antenna device are arranged with opposing antenna sensitivity patterns.

6. The UWB localization device according to claim 5, wherein the processing unit is configured to determine a location of the UWB transmitter by processing signal properties of UWB signals received by the UWB receiver:

at the first antenna device and the second antenna device; and/or at the third antenna device and the fourth antenna device.

7. The UWB localization device according to claim 1, wherein the UWB receiver further comprises:

a third antenna device for receiving UWB signals from a UWB transmitter, a second UWB shield arranged between the first antenna device and the third antenna device and configured such as to cause a delay in the second time of arrival of UWB signals from the UWB transmitter received at the third antenna device, wherein the third antenna device and the first antenna device are arranged spaced apart along a secondary axis perpendicular to a plane defined by the second UWB shield, wherein the second UWB shield is arranged at a first angle to the UWB shield supplementary to an angle defined by the first axis and the secondary axis;

a third UWB shield arranged between the second antenna device and the third antenna device and configured such as to cause a delay in the second time of arrival of UWB signals from the UWB transmitter received at the third antenna device, wherein the second antenna device and the third antenna device are arranged spaced apart along a tertiary axis perpendicular to a plane defined by the third UWB shield, wherein the third UWB shield is arranged at a second angle to the first UWB shield supplementary to an angle defined by the first axis and the tertiary axis;

wherein the antenna sensitivity pattern of the third antenna device and the first antenna device are characterized by an inward sensitivity to UWB signals facing the second UWB shield along the secondary axis and an outward sensitivity to UWB signals facing away from the second UWB shield along the secondary axis, the inward sensitivity being weaker than the outward sensitivity; and wherein the antenna sensitivity pattern of the third antenna device and the second antenna device are characterized by an inward sensitivity to UWB signals facing the third UWB shield along the tertiary axis and an outward sensitivity to UWB signals facing away from the third UWB shield along the tertiary axis, the inward sensitivity being weaker than the outward sensitivity.

8. The UWB localization device according to claim 7, wherein the processing unit is configured to determine a location of the UWB transmitter by processing signal properties of UWB signals received by the UWB receiver:

at the first antenna device and the second antenna device; and/or at the second antenna device and the third antenna device; and/or at the first antenna device and the third antenna device.

9. A security control system comprising a UWB localization device according to claim 1 and one or more access control barrier(s) arranged within a secure control area, wherein the security control system is configured to control access through the barrier(s) based on the location of the UWB transmitter.

10. A portable computing device comprising a human interaction device HID, a communication device for data communication, a processor and a UWB localization device according to claim 1.

11. A method for determining a location of a UWB transmitter using a UWB localization device according to claim 1, the method comprising the steps:

receiving, by the UWB receiver, UWB signals from the UWB transmitter using the first antenna device and the second antenna device;

determining, by processing signal properties of the UWB signals received by the UWB receiver, a first time of arrival and a second time of arrival of UWB signals from the UWB transmitter at the first antenna device and at the second antenna device, respectively; and determining a location of the UWB transmitter based on the first time of arrival and the second time of arrival.

12. The method according to claim 11, wherein determining the location of the UWB transmitter is performed considering an influence on the second time of arrival of:

an increase of a distance travelled by UWB signal(s) from the UWB transmitter to the second antenna device due to the presence of the UWB shield; and/or a difference between a first amplitude of the UWB signal received by the first antenna device and a second amplitude of the UWB signal received by the second antenna device due to their opposing antenna sensitivity patterns; and/or a delay in the second time of arrival of UWB signals at the second antenna device attributed to a reduction in propagation speed of UWB signals due to the presence of the UWB shield.

13. The method according to claim 11, using a UWB localization device according to claim 5, wherein the location of the UWB transmitter is determined by processing signal properties of UWB signals received by the UWB receiver at:

the first antenna device and the second antenna device; and/or the third antenna device and the fourth antenna device.

14. An access control method comprising the steps:

determining a location of an authentication device(s) comprising a UWB transmitter (102) using the method according to claim 11;

receiving authentication data from the authentication device(s);

verifying the authentication data in order to determine whether the authentication device(s) is authorized in view of its determined location of the authentication device; and granting access if the authentication device(s) is authorized.

15. The access control method according to claim 14, wherein determining whether the authentication device(s) is authorized comprises determining whether the determined location of the authentication device is within a security perimeter associated with the UWB localization device.

16. The access control method according to claim 15, further comprising denying, disregarding and/or blocking authentication requests from the authentication device if the determined location of the authentication device is not within the security perimeter associated with the UWB localization device.

\* \* \* \* \*